Figure 1:
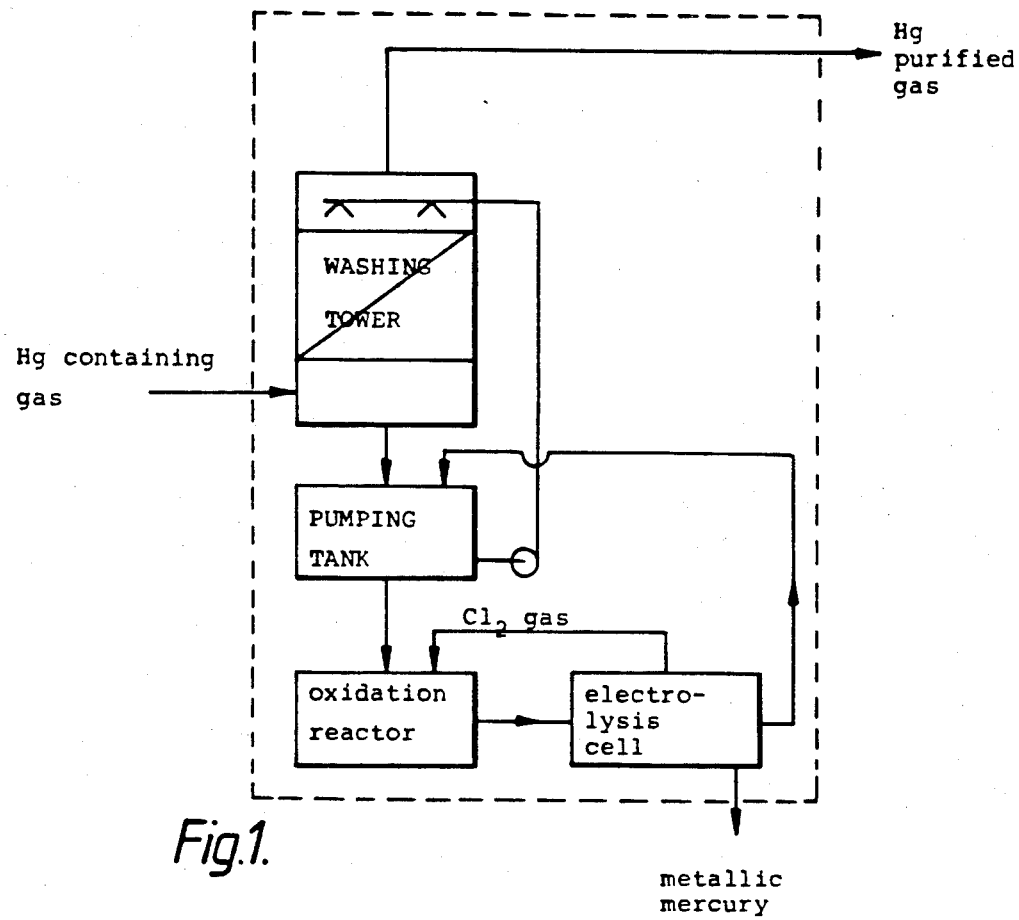

United States Patent [19]

Dyvik et al.

[11] Patent Number: 4,640,751
[45] Date of Patent: Feb. 3, 1987

[54] METHOD FOR THE PURIFICATION OF GASES CONTAINING MERCURY AND SIMULTANEOUS RECOVERY OF THE MERCURY IN METALLIC FORM

[75] Inventors: Frøystein Dyvik; Kjetil Børve, both of Odda, Norway

[73] Assignee: Boliden Aktiebolag, Stockholm, Sweden

[21] Appl. No.: 784,464

[22] Filed: Oct. 4, 1985

[30] Foreign Application Priority Data

Oct. 19, 1984 [NO] Norway .................................. 844201

[51] Int. Cl.$^4$ ............................................... C25C 1/00
[52] U.S. Cl. ................................ 204/105 R; 204/128; 204/130; 423/99; 423/107; 423/491
[58] Field of Search ............ 204/128, 130, 140, 105 R, 204/124; 423/99, 107, 491

[56] References Cited

U.S. PATENT DOCUMENTS 3,647,359  3/1972  Bell ........................................ 423/99
3,849,537  11/1974  Allgulin ................................ 204/99
4,208,258  6/1980  Balko .................................... 204/130

Primary Examiner—R. L. Andrews
Attorney, Agent, or Firm—Burns, Doane, Swecker & Mathis

[57] ABSTRACT

A method for the purification of gases containing mercury and simultaneous recovery of the mercury in metallic form by a process where primarily a reaction takes place between metallic vapory mercury and mercury (II)-chloride compounds in solution in a liquid phase, during which the formation and deposition of only slightly soluble Hg (I)-chloride (calomel) occur, the deposited calomel being oxidized to easily soluble Hg (II)-chloride compounds by the adding of chlorine, and metallic mercury and at least some of the chlorine used being recovered by electrolysis of said formed Hg(II)-chloride.

8 Claims, 1 Drawing Figure

METHOD FOR THE PURIFICATION OF GASES CONTAINING MERCURY AND SIMULTANEOUS RECOVERY OF THE MERCURY IN METALLIC FORM

The invention concerns a method for the purification of gases for gaseous elementary mercury and the recovery of the mercury in metal form through a process of electrolysis.

The method is especially well suited for the processing of process gases which have their origin in thermal processes, e.g. metallurgical processes, where a calcination or melting process takes place, and particularly for the processing of gases that contain sulphur in the form of sulphur dioxide. The method is also applicable to gases generally, such as air, hydrogen, nitrogen etc.

The motivation behind the method is primarily to be found among environmental considerations. In recent years in particular, there has been a clear recognition that mercury is extremely toxic to the environment. This has led to a steady tightening of restrictions on any form of discharge or dispersion of mercury to the environment. As a result, industry is faced with new requirements concerning the mercury content in process emissions and in products. Thus, in the EEC countries, according to a new directive of Mar. 8, 1984, new and stricter limiting values have been determined for mercury emissions from the chemical and metallurgical industries in general.

When metallic raw materials are treated through a thermal process, such as drying, calcination, roasting or melting, it will become apparent in many cases, through a closer study, that there is an environmental problem because of the mercury. If an even low concentration of mercury is present in the raw material, in a thermal process this will very often be volatilized and cause the off-gases to contain mercury. This may lead to considerable problems.

If the raw materials are sulphidic, burning off of the sulphur will usually be performed as the first step in a metallurgic process, so-called roasting. In such cases, a roasting gas containing sulphur will be produced, which will also contain mercury. When this gas is processed further in the production of sulphuric acid, this acid will usually absorb mercury to such a degree that it may lead to serious quality deterioration. Sulphuric acid is to a large extent utilized in the production of fertilizer products or other products that enter the food chain.

In the light of the new EEC regulations, any increase in the intake of mercury in a chemical industry may lead to secondary mercury emission problems, in that the mercury either finds its way to the products, or occurs in the process discharge in too large an amount. The practical concequence of this is that all sulphuric acid must meet strict requirements with respect to its mercury content in order that it may be marketed without problems.

There exist a number of propositions and also several industrial processes for the removal of the mercury content in gases, thereby to ensure the achievement of the desired result.

Undoubtedly, the method to be most widely utilized in industry is the one known under the name of "the Boliden/Norzink process". The process is dealt with in U.S. Pat. Nos. 3,849,537 and 4,233,274. The industrial embodiment of the process has been described in several publications, for example in a particularly detailed manner by Georg Steintveit in Proc. AIME "Lead-Zinc-Tin 80", p. 85ff. This publication may be regarded as describing the prior art in the "Boliden/Norzink process". It can be seen from this that the gas containing mercury, when ready to be purified, is subjected to a process of washing in a reaction tower. Here a reaction takes place between metallic mercury in the gas and mercuric ($Hg^{2+}$) ions in solution in a liquid phase, whereby only slightly soluble mercurous ($Hg^+$) compounds are deposited and may be removed from the system. In the technical embodiment the use of mercuric chloride compounds is preferred in the washing process.

It has been documented that this process gives very satisfactory results, and that an efficiency of up to 99.9% is achieved in mercury removal in industrial plants. The process is cheap as to installation and operation and requires little supervision.

However, the above-mentioned process has some drawbacks, viz:

The end product resulting from the purification process is calomel ($Hg_2Cl_2$). The market for calomel is limited, and it is not the ideal form of further treatment in conventional plants for the production of mercury, because of the volatility of chloride.

In the technical process, chlorine is used as an oxidation agent to re-oxidize mercurous ($Hg^+$) chloride to mercuric ($Hg^{2+}$) compounds, thereby to regenerate parts of the active reagent in the process. The storage of chlorine may represent a considerable safety hazard, and demands special safety measures.

The present invention discloses a technique which substantially improves the circumstances mentioned above. The invention concerns a process comprising the following linked features:

(1) Purification of the gas flow by removing metallic mercury in accordance with the main feature of U.S. Pat. No. 3,849,537. The gas is washed in a reactor with a solution of mercuric chloride during the formation of only slightly soluble calomel.

(2) All the deposited calomel is conducted to a reactor, where chlorine is added in such a manner that oxidation occurs of mercury from only slightly soluble $Hg_2Cl_2$ during the formation of easily soluble $Hg^{2+}$ chloride compounds. A relatively strong solution of mercuric chloride is thus prepared.

(3) This mercuric chloride solution is supplied to an electrolytic cell and electrolysis is carried out in such a way that mercury is deposited as metal on the cathode, and anodically, chlorine is produced.

(4) The chlorine is led away and supplied to the oxidation reactor as described above under Step (2).

(5) After approx. 50% of the mercury content in the strong mercuric chloride solution has been reduced out by electrolysis, the partially depleted electrolyte is conducted back to the washing tower for mercury purification, with a view to retaining the content of mercuric ions in the washing solution at an optimum level.

Thus, the invention concerns a method of purification of gases containing mercury and of simultaneous recovery of the mercury in metallic form by a process where primarily a reaction occurs between metallic, vaporous mercury and mercury-(II)-chloride compounds in solution in a liquid phase, during which the formation and deposition of only slightly soluble Hg (I)-chloride-calomel occur, the method being characterized in that the deposited calomel is oxidized to easily soluble Hg (II)-chloride compounds by the addition of chlorine, and that metallic mercury and at least some of the chlorine used is recovered by electrolysis of said formed Hg(II)-chloride.

The process is shown in FIG. 1 and is expressed by the reaction equations below.

The method is based on a reaction pattern which may be described in a simplified manner by the following reaction equations and the stoichiometry deduced from the latter:

(A): $Hg^0_{(gas)} + HgCl_{2(liq)} = Hg_2Cl_{2(sol)}$ —(Main reaction)

(B): $Hg_2Cl_{2(sol)} + Cl_{2(gas)} = 2HgCl_{2(liq)}$ —(Oxidation)

(C): $HgCl_{2(liq)} + E = Hg^0_{(liq)} + Cl_{2(gas)}$ —(Electrolysis)

On adding up the equations (A)+(B)+(C), one gets (D): $Hg^0_{(gas)} + E = Hg^0_{(liq)}$ —where E signifies electric energy added during the electrolysis.

As can be seen from this, the method is self-sufficient with respect to chlorine, if half the mercuric chloride prepared in accordance with the equation (B) above is subjected to electrolytic dissociation through electrolysis.

Figure 2:
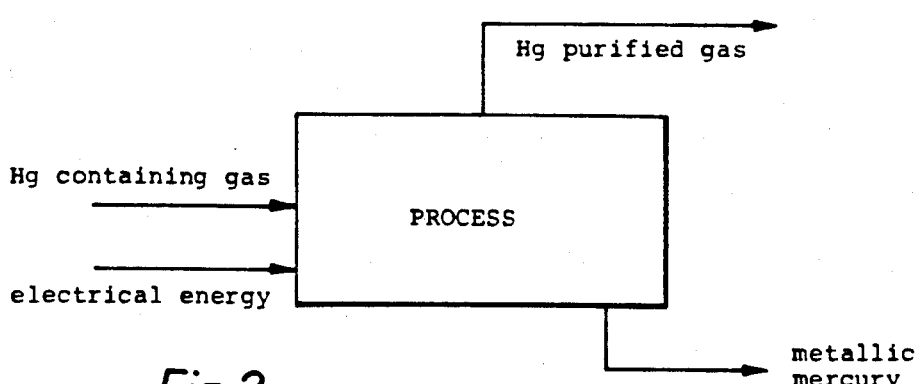

An obvious advantage achieved through a reaction pattern as described here, is that a considerable simplification of the method occurs. As a total reaction, a method takes place wherein the input flow is as impure gas and electric energy, and wherein the output flow consists of a mercury-purified gas and an amount of metallic mercury corresponding to the amount that has been removed from the gas. This total process is shown in FIG. 2.

A prerequisite of succeeding in making the method work, is that there is a solution to the special problems associated with a process of electrolysis where an electrolyte consisting principally of a mercuric chloride solution is used.

EXAMPLE 1

In order to try out and optimize the experimental conditions, during a number of experiments with the oxidizing of mud containing calomel from a technical plant using the "Boliden/Norzink process", there were produced solutions of mercuric chloride with typical analyses within the areas:

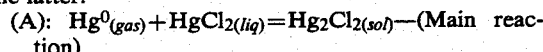

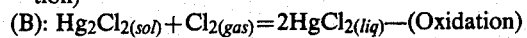

Electrolysis experiments in a laboratory were carried out with solutions of the above composition. The result was studied using a number of anode and cathode materials, and experiments with vertical as well as horizontal electrodes. In the course of this, one arrived at the conclusion that the best results were achieved using cathodes that were either nickel or metallic mercury. The most suitable anode materials were found to be either carbon or anodes consisting of a conductive, stable metal oxide coating on a supporting structure of a durable metal (for example titanium), anodes commonly known under the name of "dimension stable anodes" ("DSA anodes").

EXAMPLE 2

A solution produced as described above and with the analysis:

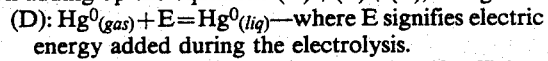

was used as the electrolyte in a pilot electrolytic cell provided with a horizontal mercury cathode and with horizontal "DSA anodes". Electrolysis of the solution was performed until the Hg(2+) content was reduced to 21 g/l. The chlorine that was anodically separated down was collected and conducted to a reactor, where it was made to react with calomel. Metallic mercury that had separated down was collected. Current efficiency was calculated on the basis of mercury (Hg$^{2+}$) analyses of the electrolyte. During the current experimental conditions, current efficiency in the region of 90–100% was registered.

We claim:

1. A method for the purification of gas containing mercury and the recovery of mercury in metallic form comprising:
    (a) reacting metallic vaporous mercury in the gas with mercuric chloride compounds in a liquid phase whereby mercurous chloride is formed;
    (b) oxidizing the mercurous chloride with chlorine in a liquid phase whereby a concentrated solution of mercuric chloride compounds is formed;
    (c) subjecting the concentrated solution of mercuric chloride compounds to electrolysis whereby metallic mercury and chlorine is formed; and
    (d) supplying said formed chlorine to step (b).

2. The method of claim 1 wherein an electrolytic cell is used for the electrolysis, said electrolytic cell being provided with a nickel or metallic mercury cathode and an anode of carbon or a conductive, stable metal oxide coating on a supporting metal structure.

3. The method of claim 2 wherein the mercurous chloride is oxidized and an electrolyte composed of the concentrated solution of mercuric chloride is produced whereupon approximately half the mercury content of the electrolyte is reduced through electrolysis, the partially depleted electrolyte then being recycled for reaction with further metallic vaporous mercury to maintain an optimum concentration of mercury (II) ions in the liquid phase.

4. The method of claim 1 wherein the mercurous chloride is oxidized and an electrolyte composed of the concentrated solution of mercuric chloride is produced whereupon approximately half the mercury content of the electrolyte is reduced through electrolysis, the partially depleted electrolyte the being recycled for reaction with further metallic vaporous mercury to maintain an optimum concentration of mercury (II) ions in the liquid phase.

5. The method of claim 4 wherein the oxidizing of the mercurous chloride produces an electrolyte having a mercury (II) concentration of 30–70 g/l and wherein mercury is removed subsequent to said electrolysis in an amount so as to reduce the mercury (II) concentration of the electrolyte to from 15 to 35 g/l, the electrolyte having the reduced mercury (II) concentration being recycled for reaction with further metallic vaporous mercury.

6. The method of claim 3 wherein the oxidizing of the mercurous chloride produces an electrolyte having a mercury (II) concentration of 30–70 g/l and wherein mercury is removed subsequent to said electrolysis in an amount so as to reduce the mercury (II) concentration of the electrolyte to from 15 to 35 g/l, the electrolyte having the reduced mercury (II) concentration being recycled for reaction with further metallic vaporous mercury.

7. The method of claim 2 wherein the oxidizing of the mercurous chloride produces an electrolyte having a mercury (II) concentration of 30–70 g/l and wherein mercury is removed subsequent to said electrolysis in an amount so as to reduce the mercury (II) concentration of the electrolyte to from 15 to 35 g/l, the electrolyte having the reduced mercury (II) concentration being recycled for reaction with further metallic vaporous mercury.

8. The method of claim 1 wherein the oxidizing of the mercurous chloride produces an electrolyte having a mercury (II) concentration of 30–70 g/l and wherein mercury is removed subsequent to said electrolysis in an amount so as to reduce the mercury (II) concentration of the electrolyte to from 15 to 35 g/l, the electrolyte having the reduced mercury (II) concentration being recycled for reaction with further metallic vaporous mercury.

* * * * *